(12) United States Patent
Hashimoto

(10) Patent No.: US 8,874,058 B2
(45) Date of Patent: Oct. 28, 2014

(54) STREAM SIGNAL TRANSMISSION DEVICE AND TRANSMISSION METHOD

(75) Inventor: Kiyoshi Hashimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 301 days.

(21) Appl. No.: 13/147,669

(22) PCT Filed: Jan. 20, 2010

(86) PCT No.: PCT/JP2010/000310
§ 371 (c)(1),
(2), (4) Date: Aug. 3, 2011

(87) PCT Pub. No.: WO2010/089962
PCT Pub. Date: Aug. 12, 2010

(65) Prior Publication Data
US 2011/0291723 A1 Dec. 1, 2011

(30) Foreign Application Priority Data
Feb. 6, 2009 (JP) ................ P2009-026460

(51) Int. Cl.
*H04B 7/00* (2006.01)
*H04L 12/26* (2006.01)
*H04L 12/28* (2006.01)
*H04N 21/242* (2011.01)
*H04N 7/24* (2011.01)
*H04N 21/43* (2011.01)

(52) U.S. Cl.
CPC ............ *H04N 7/24* (2013.01); *H04N 21/242* (2013.01); *H04N 21/4307* (2013.01)
USPC .................. 455/242.1; 370/248; 370/389

(58) Field of Classification Search
USPC ............ 455/428, 440, 63.1, 67.11, 70, 570, 455/115.1, 173.1, 181.1, 197.1, 231, 242.1, 455/242.2, 284, 305, 18; 348/512, 515, 348/423.1, 473, 478, 465, 425; 370/400, 370/509, 243, 419, 389
See application file for complete search history.

(56) References Cited

U.S. PATENT DOCUMENTS 7,647,060 B2 * 1/2010 Kawamura et al. ........... 455/502
8,089,979 B2 * 1/2012 Yoshida et al. ............... 370/419
(Continued)

FOREIGN PATENT DOCUMENTS

JP 2002-369163 A 12/2002
JP 2003-163897 A 6/2003
(Continued)

OTHER PUBLICATIONS

International Search Report for PCT/JP2010/000310 mailed Feb. 16, 2010.
(Continued)

*Primary Examiner* — Andrew Wendell
*Assistant Examiner* — Cindy Trandai
(74) *Attorney, Agent, or Firm* — Sughrue Mion, PLLC

(57) ABSTRACT

Provided is a stream signal transmission device that can eliminate transmission delay fluctuation with a fast change such as network jitter with high accuracy and synchronize a plurality of streams. The stream signal transmission device includes at least one reception unit that receives a stream signal to which a time code is attached from a network, at least one extraction unit that extracts the time code from the stream signal received by the reception unit, and at least one delay control unit that determines an output time by adding a predetermined fixed delay to a time indicated by the time code extracted by the extraction unit, and outputs the stream signal received by the reception unit after holding the stream signal up to the output time.

6 Claims, 9 Drawing Sheets

(56) References Cited

U.S. PATENT DOCUMENTS

| | | | |
|---|---|---|---|
| 2001/0007136 A1* | 7/2001 | Tamura et al. | 713/500 |
| 2005/0078672 A1* | 4/2005 | Caliskan et al. | 370/389 |
| 2006/0007943 A1* | 1/2006 | Fellman | 370/400 |
| 2010/0250781 A1* | 9/2010 | Matsunaga | 709/248 |
| 2011/0242992 A1* | 10/2011 | Okada et al. | 370/243 |

FOREIGN PATENT DOCUMENTS

| | | |
|---|---|---|
| JP | 2005-151463 A | 6/2005 |
| JP | 2006-50656 A | 2/2006 |
| JP | 2006-115264 A | 4/2006 |
| JP | 2007-324872 A | 12/2007 |

OTHER PUBLICATIONS

Japanese Office Action for JP 2009-026460 mailed on Feb. 5, 2013 with Partial English Translation.

* cited by examiner

STREAM SIGNAL TRANSMISSION DEVICE AND TRANSMISSION METHOD

TECHNICAL FIELD

The present invention relates to a stream signal transmission device and a transmission method to be preferably used when video and/or audio streams are transmitted via a network.

BACKGROUND ART

Recently, video and/or audio stream transmission via a network such as an Internet protocol (IP) network has been possible as a result of remarkable development of communication technology. In the video and/or audio stream transmission via the network such as the IP network, it is possible to realize transmission of video streams and audio streams at a low cost as compared with television broadcasting.

However, in the video and/or audio stream transmission via the network, the transmission time from a transmission side to a reception side is significantly different depending on a used band, a network congestion state, and/or a network path difference. The transmission time also fluctuates depending on network jitter or the like. Because of fluctuation in the transmission time, the reception side may not synchronize and output a plurality of streams even when the transmission side synchronizes and transmits the plurality of streams.

Moreover, in the network transmission, if a plurality of streams is transmitted for one program and if two streams are generated from one program and transmitted using a redundant line, a function of synchronizing a plurality of streams is necessary in the reception side. The former is, for example, the transmission of videos obtained by imaging one subject using a plurality of cameras. If network transmission times of all streams are not identical, temporal incongruity is generated when the streams are switched on the reception side. The latter is, for example, a case in which network transmission of one program is performed using the redundant line, and working/protection switching of two streams is performed in the reception side. If delay times of the two streams are not equally synchronized, discontinuity occurs in the streams at the time of switching.

To solve these problems, a function of adjusting transmission delays of a plurality of streams of video, audio, or the like via the network is necessary. Thus, the transmission side transmits the plurality of streams to the network by attaching time codes thereto, and the reception side synchronizes the plurality of streams by adjusting the delays of the respective streams using the time codes (for example, see Patent Document 1).

PRIOR ART DOCUMENT

Patent Document

Patent Document 1: Japanese Unexamined Patent Application, First Publication No. 2002-369163

DISCLOSURE OF THE INVENTION

Problems to be Solved by the Invention

Here, technical problems of the related art disclosed in Patent Document 1 will be described with reference to FIG. 9. FIG. 9 is a block diagram showing a configuration of a reception side system. A transmission side system (not shown) is connected to a network 9 of FIG. 9. In the transmission side system, time codes are attached to a plurality of pieces of video data and audio data to be transmitted, and a plurality of video/audio streams (two video/audio streams in this case) are transmitted to the network 9. The respective video/audio streams transmitted on the network 9 are received by reception devices 11 and 14, respectively. The video/audio streams received by the reception devices 11 and 14 are output via delay control devices 12 and 15 and a stream selection device 13 as streams "1" and "2". The time codes attached to the streams "1" and "2" are separated by a time code separation device 16, and the separated time codes are read in a time code read device 17 and input to a time code difference measurement device 21. On the other hand, a time code generated in the reception side using an absolute reference time reception device 20, a time code generation device 19, and a time code read device 18 is also input to the time code difference measurement device 21. A delay instruction device 22 controls delay amounts of the delay control devices 12 and 15 so that differences between the time codes attached to the streams and the time code generated in the reception side become constant. Thus, it is possible to synchronize the streams "1" and "2".

However, delay adjustment control in such a configuration is performed by feedback control in which the differences between the time codes attached to the streams "1" and "2" output from the delay control devices 12 and 15 and the time code generated in the reception side are measured, and the delay amounts of the delay control devices 12 and 15 are adjusted in accordance with the delay differences measured based on outputs of the delay control devices 12 and 15. In this feedback control, when data having a delay difference different from a current delay difference is input, a delay amount for the next correction is set based on the difference. Accordingly, at least reception data of the delay difference different from the current delay difference is directly output without delay correction. In this way, the delay control of the above-described configuration has a problem in that it may not be possible to follow transmission delay fluctuation with a fast change such as network jitter.

The present invention has been made in view of the above-described circumstances, and an exemplary object thereof is to provide a stream signal transmission device and a transmission method that can eliminate transmission delay fluctuation with a fast change such as network jitter with high accuracy and synchronize a plurality of streams.

Means for Solving the Problems

To achieve the foregoing exemplary object, the present invention is a stream signal transmission device including: at least one reception unit that receives a stream signal to which a time code is attached from a network; at least one extraction unit that extracts the time code from the stream signal received by the reception unit; and at least one delay control unit that determines an output time by adding a predetermined fixed delay to a time indicated by the time code extracted by the extraction unit, and outputs the stream signal received by the reception unit after holding the stream signal up to the output time.

Also, the present invention is a stream signal transmission method including: receiving a stream signal to which a time code is attached from a network; extracting the time code from the received stream signal; and determining an output time by adding a predetermined fixed delay to a time indicated by the extracted time code, and outputting the received stream signal after holding the received stream signal up to the output time.

Effect of the Invention

In the present invention, delay control is performed in which an output time is determined by adding a predetermined fixed delay to a time indicated by a time code attached to a received stream signal, and the received stream signal is output after holding the received stream signal up to the output time. Therefore, it is possible to absorb fluctuation in transmission time within the fixed delay, maintain the output time to a set constant value corresponding to the fixed delay, eliminate transmission delay fluctuation with a fast change such as network jitter with high accuracy, and synchronize a plurality of streams.

MODE FOR CARRYING OUT THE INVENTION

[First Exemplary Embodiment]

Figure 1:
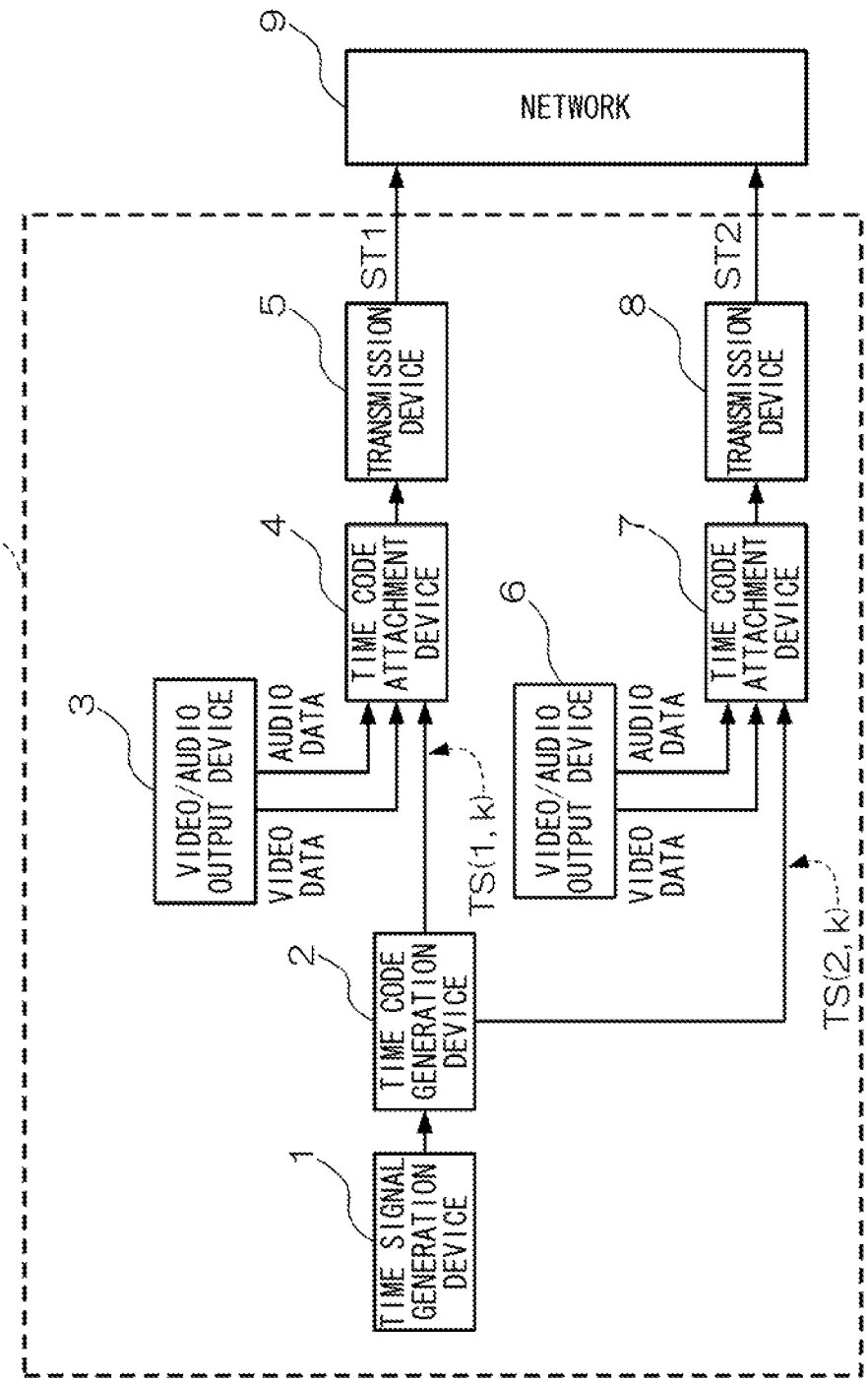
FIG. 1 is a block diagram showing a configuration of a transmission side of a first exemplary embodiment of the present invention.
Figure 2:
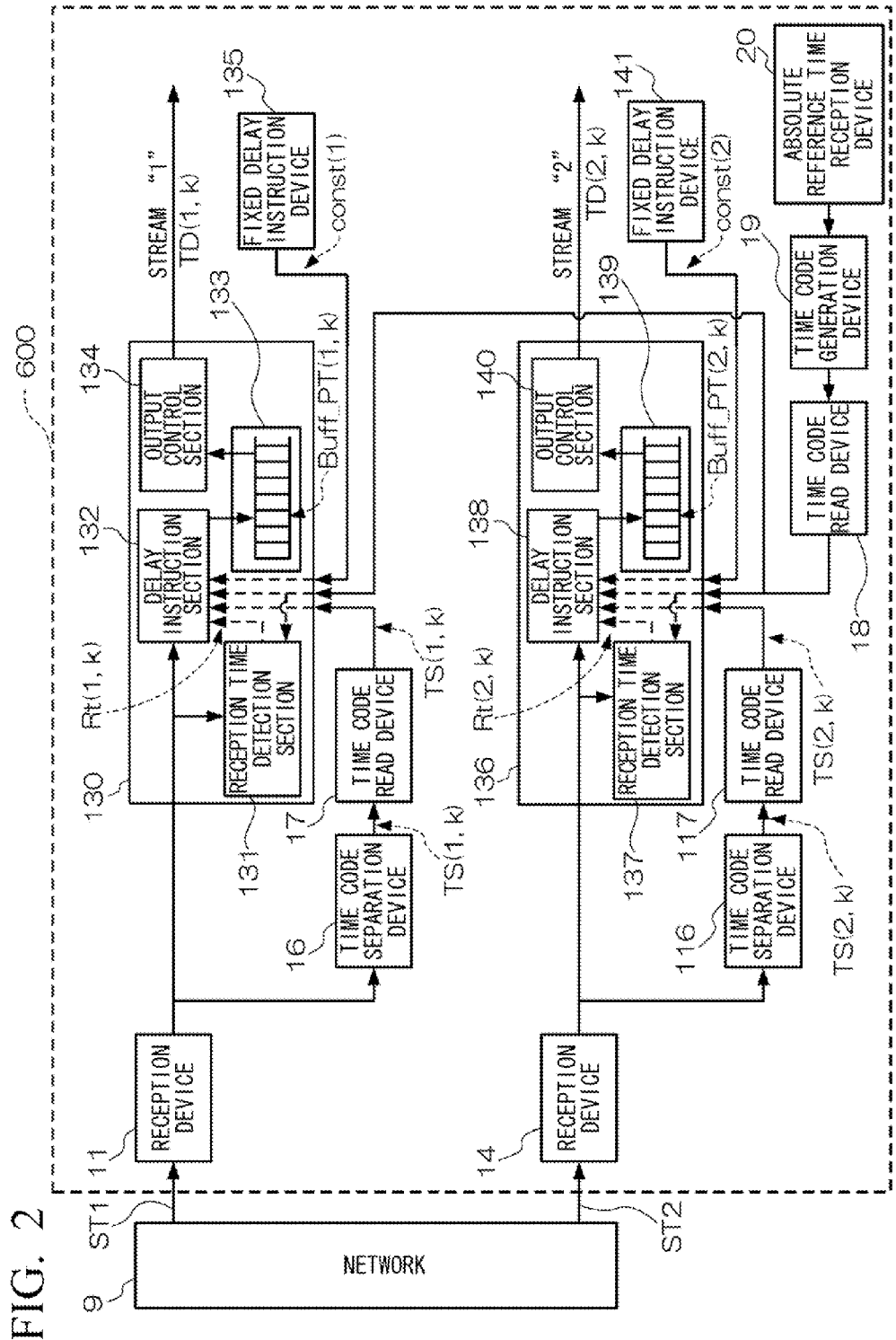
FIG. 2 is a block diagram showing a configuration of a reception side of the first exemplary embodiment of the present invention.

A first exemplary embodiment of the present invention will be described based on the drawings. A stream signal transmission device of the first exemplary embodiment of the present invention is shown in FIGS. 1 and 2. The stream signal transmission device of the first exemplary embodiment of the present invention is configured by a transmission side system-A 500 shown in FIG. 1, a reception side system-A 600 shown in FIG. 2, and a network 9 shown in FIGS. 1 and 2. However, it can be construed that an exemplary aspect of the present invention is configured by only the reception side system-A 600, it is configured by the transmission side system-A 500 and the reception side system-A 600, or it is configured by one or more sets of the transmission side system-A 500 and/or the reception side system-A 600. It is to be noted that the present exemplary embodiment can be configured to partially or entirely use software control using a central processing unit (CPU) and a program, or configured to partially or entirely use various analog and/or digital circuits, and the like.

First, a block configuration diagram of the transmission side system-A 500 shown in FIG. 1 will be described. The transmission side system-A 500 of FIG. 1 is configured by a time signal generation device 1, a time code generation device 2, video/audio output devices 3 and 6, time code attachment devices 4 and 7, and transmission devices 5 and 8. The transmission side system-A 500 shown in FIG. 1 is provided with two sets of devices including the video/audio output devices 3 and 6, the time code attachment devices 4 and 7, and the transmission devices 5 and 8, so that two video/audio streams ST1 and ST2 are output to the network 9. However, by providing three or more configuration sets, it is possible to make the configuration so that three or more video/audio streams STi (i=1, 2, . . . , n) can be output. Here, i is a stream number and n is a natural number indicating the total number of a plurality of streams.

It is to be noted that the video/audio stream STi is configured by a plurality of pieces of time-series video/audio data, and each piece of time-series data is denoted by ST(i, k). Here, k is a variable indicating the order of each piece of data of a video/audio data sequence including a plurality of pieces of time-series video/audio data. Moreover, i is a variable indicating a stream number as described above. Hereinafter, the variable i and the variable k are used as the stream number and each data number.

In the transmission side system-A 500 of FIG. 1, the time signal generation device 1 receives an absolute reference time signal transmitted from a global positioning system (GPS) satellite (not shown) or the like and/or a time signal from a server of a network time synchronization system (not shown) or the like, and outputs the time signal included in the received signal to the time code generation device 2. The time code generation device 2 generates a predetermined time code $TS(i, k)$ in response to the time signal. The time code $TS(i, k)$ is data in a predetermined-format that indicates time. In the example shown in FIG. 1, the time code generation device 2 generates two time codes $TS(1, k)$ and $TS(2, k)$ having the same content.

The time code $TS(1, k)$ is input to the time code attachment device 4, and the time code $TS(2, k)$ is input to the time code attachment device 7. Video and/or audio data output from the video/audio output device 3 is also input to the time code attachment device 4. For example, the video/audio output device 3 receives a video/audio data signal via a predetermined device or a communication line (not shown), or reads a video/audio data signal from a predetermined recording medium, thereby outputting video data and audio data based thereon. After attaching the video/audio data output from the video/audio output device 3 to the time code $TS(1, k)$ (or after attaching the time code $TS(1, k)$ to the video/audio data output from the video/audio output device 3) the time code attachment device 4 outputs them to the transmission device 5. Thereafter, the video/audio data and the time code $TS(1, k)$ are output from the transmission device 5 to the network 9 as the video/audio stream ST1.

On the other hand, the other video data and audio data assumed to be output in synchronization with the video data and the audio data output from the video/audio output device 3 are output from the video/audio output device 6 having the same configuration as the video/audio output device 3, and input to the time code attachment device 7. The time code $TS(2, k)$ from the time code generation device 2 is input to the time code attachment device 7. After attaching the video/audio data output from the video/audio output device 6 to the time code TS(2, k) (or after attaching the time code TS(2, k) to the video/audio data), the time code attachment device 7 outputs them to the transmission device 8. Thereafter, the video/audio data and the time code TS(2, k) are output from the transmission device 8 to the network 9 as the video/audio stream ST2.

Next, a block configuration diagram of the reception side system-A 600 shown in FIG. 2 will be described. The reception side system-A 600 of FIG. 2 is configured by reception devices 11 and 14, time code separation devices 16 and 116, time code read devices 17 and 117, delay control devices 130 and 136, fixed delay instruction devices 135 and 141, a time code read device 18, a time code generation device 19, and an absolute reference time reception device 20. The reception side system-A 600 shown in FIG. 2 is provided with two sets of devices including the reception devices 11 and 14, the time code separation devices 16 and 116, the time code read devices 17 and 117, the delay control devices 130 and 136, and the fixed delay instruction devices 135 and 141, so that the two video/audio streams ST1 and ST2 are received from the network 9 and two streams "1" and "2" are output.

In the present exemplary embodiment, the reception side system-A 600 receives the two video/audio streams ST1 and ST2 transmitted from the transmission side system-A 500 of FIG. 1 via the network 9. The time code TS(1, k) and the time code TS(2, k) are attached to (or included in) the respective pieces of data ST(1, k) and ST(2, k) constituting the video/audio streams ST1 and ST2. The reception side system-A 600 applies preset fixed delays to the received video/audio streams ST1 and ST2 to synchronize them, and outputs them as the streams "1" and "2". However, by providing three or more configuration sets in correspondence with the two streams ST1 and ST2, it is possible to receive three or more video/audio streams ST1, ST2, . . . , STn and to output streams "1" "2" . . . "n".

As described above, in the reception side system-A 600 of FIG. 2, the reception devices 11 and 14 receive the video/audio streams ST1 and ST2 transmitted on the network 9. After a delay amount is adjusted in the delay control device 130, the video/audio stream ST1 received in the reception device 11 is output as the stream "1". After a delay amount is adjusted in the delay control device 136, the video/audio stream ST2 received in the reception device 14 is output as the stream "2".

On the other hand, the absolute reference time reception device 20 generates a reference time signal based on an absolute reference time signal transmitted from the GPS satellite or the like, and/or a time signal received from the server of the network time synchronization system or the like. The absolute reference time signal output from the absolute reference time reception device 20 is input to the time code generation device 19. The time signal input to the time code generation device 19 is converted into a time code and the time code is input to the time code read device 18. The time code read device 18 reads the input time code and transmits the time code to the delay control devices 130 and 136.

Moreover, the fixed delay instruction device 135 transmits a predetermined fixed delay amount const(1) to the delay control device 130. If an output time of each piece of data of the stream "1" is denoted by TD(1, k), the fixed delay amount const(1) is a time corresponding to the difference between the output time TD(1, k) and the time code TS(1, k), that is, data corresponding to a time that satisfies a relationship of TD(1, k)=TS(1, k)+const(1). The delay control device 130 performs control so that the output time TD(1, k) of each piece of data of the stream "1" output from the reception side system-A 600 of the present exemplary embodiment becomes a value obtained by adding the fixed delay amount const(1) to the time code TS(1, k) of each piece of data ST(1, k) of the input video/audio stream ST1. That is, the delay control device 130 performs delay control so that each piece of data of the received video/audio stream ST1 is held until the output time TD(1, k) is reached, and each piece of data of the video/audio stream ST1 held until the output time TD(1, k) is reached is output as the stream "1". The fixed delay amount const(1) is a time which serves as an adjusting allowance for enabling the delay control device 130 to adjust delay differences between a plurality of streams "1", "2", . . . , and it is set by considering a transmission time on the network 9, the delay differences between the streams, or the like. It is to be noted that if a stream number of each of the plurality of streams is denoted by i, the fixed delay amount is denoted by const(i) and the output time is denoted by TD(i, k) (i=1, 2, . . . , n).

Moreover, the delay control device 130 is configured by a reception time detection section 131, a delay instruction section 132, a delay absorbing buffer 133, and an output control section 134. The reception time detection section 131 detects and outputs a time Rt(1, k) when the reception device 11 has received the reception data ST(1, k) based on the time code transmitted from the time code read device 18. Here, the reception time Rt can be generalized and denoted as Rt(i, k). The output control section 134 determines the output time TD(1, k) by adding the fixed delay amount const(1) instructed from the fixed delay instruction device 135 to the time code TS(1, k) obtained by the time code read device 17 from the reception data ST(1, k).

The delay instruction section 132 calculates the difference between the output time TD(1, k) of the reception data ST(1, k) and the reception time Rt(1, k), and instructs a storage position of the reception data ST(1, k) to the delay absorbing buffer 133 so that the calculated difference becomes a delay time (i.e., a holding time) thereof. For example, the delay absorbing buffer 133 is configured by a shift register formed of a plurality of stages of registers, which shifts stored information in a unit of a plurality of bits in response to a predetermined clock signal. In this case, the delay instruction section 132 performs control as to which register of the plurality of stages of registers in the delay absorbing buffer 133 stores each piece of reception data ST(1, k). In addition, the output control section 134 detects the output time TD(1, k) of the reception data ST(1, k) stored in the delay absorbing buffer 133, and outputs the reception data ST(1, k) for which the output time TD(1, k) has been reached as the stream "1". That is, in the output control section 134, the stored reception data ST(1, k) is extracted from a predetermined register of the plurality of stages of registers at the output time TD(1, k), and is output as the stream "1". In this case, a delay time (i.e., a holding time) of each piece of reception data ST(1, k) in the delay absorbing buffer 133 is denoted by Buff_PT(1, k). It is to be noted that an expression for generalizing and expressing this delay time is Buff_PT(i, k).

It is to be noted that a configuration of the delay absorbing buffer 133 is not limited to the above, and, for example, it can be configured based on software control using a memory for storing each piece of video/audio data ST(i, k), a table for setting a delay time and a storage position in the memory, and the like.

Likewise, an output of the reception device 14 is input to the time code separation device 116. The time code separation device 116 separates the time code TS(2, $k$) from the video/audio stream ST2, and outputs the time code TS(2, $k$) to the time code read device 117. The time code read device 117 reads the input time code TS(2, $k$), and outputs the read time code TS(2, $k$) to the delay control device 136. The fixed delay instruction device 141 transmits a fixed delay amount const(2) to the delay control device 136. The fixed delay amount const(2) is data similar to the fixed delay amount const(1), and if the output time of each piece of data ST(2, $k$) of the stream "2" is denoted by TD(2, $k$), it is a time corresponding to the difference between the output time TD(2, $k$) and the time code TS(2, $k$), that is, data corresponding to a time that satisfies a relationship of TD(2, $k$)=TS(2, $k$)+const(2). The output time TD(2, $k$) of each piece of data of the output stream "2" is controlled to be a value obtained by adding the fixed delay amount const(2) to the time code TS(2) of each piece of data ST(2, $k$) of the input video/audio stream ST2.

It is to be noted that if the streams "1" and "2" corresponding to the video/audio streams ST1 and ST2 are synchronized and output, const(1) and const(2) are set to the same value. That is, if the time codes TS(1, $k$) and TS(2, $k$) attached to k-th data ST(1, k) and ST(2, $k$) in the streams ST1 and ST2 satisfy TS(1, $k$)=TS(2, $k$) and if const(1)=const(2) is set, the output times TD(1, $k$) and TD(2, $k$) of the output streams "1" and "2" satisfy TD(1, $k$)=TD(2, $k$).

Moreover, like the delay control device 130, the delay control device 136 is configured by a reception time detection section 137, a delay instruction section 138, a delay absorbing buffer 139, and an output control section 140. The reception time detection section 137 detects a time when the reception device 14 has received the reception data ST(2, $k$) based on the time code transmitted from the time code read device 18, and outputs the detected reception time as a signal Rt(2, $k$). The output control section 140 determines the output time TD(2, $k$) by adding the fixed delay amount const(2) instructed from the fixed delay instruction device 141 to the time code TS(2, $k$) obtained by the time code read device 117 from the reception data ST(2, $k$).

The delay instruction-section 138 calculates the difference between the output time TD(2, $k$) of the reception data ST(2, $k$) and the reception time Rt(2, $k$), and instructs a storage position of the reception data ST(2, $k$) to the delay absorbing buffer 139. For example, the delay absorbing buffer 139 is configured by a shift register formed of a plurality of stages of registers, which shifts stored information in a unit of a plurality of bits in response to a predetermined clock signal. In this case, the delay instruction section 138 performs control as to which register of the plurality of stages of registers stores each piece of reception data ST(2, $k$). In addition, the output control section 140 detects the arrival of the output time TD(2, $k$) of the reception data ST(2, $k$) stored in the delay absorbing buffer 139 and outputs the reception data ST(2, $k$) as the stream "2".

That is, in the output control section 140, the stored reception data ST(2, $k$) is extracted from a predetermined register of the plurality of stages of registers at the output time TD(2, $k$), and is output as the stream "2". In this case, a delay time of each piece of reception data ST(2, $k$) in the delay absorbing buffer 139 is denoted as Buff_PT(2, $k$).

It is to be noted that the time codes TS(1, $k$) and TS(2, $k$) attached by the time code attachment devices 4 and 7 shown in FIG. 1 are set to have the same value for the streams "1" and "2", which are synchronized and output in the reception side, that is, respective pieces of video data and audio data of the video/audio streams ST1 and ST2. Moreover, although not shown, the time code separation devices 16 and 116, the time code read devices 17 and 117, the time code read device 18, the time code generation device 19, the delay control devices 130 and 136, the reception time detection sections 131 and 137, the delay instruction sections 132 and 138, and the output control sections 134 and 140 are configured to receive the same synchronization signal and operate to be synchronized.

As described above, in the present exemplary embodiment, the transmission side system-A 500 performs delay control for transmitting the stream STi to which the time code TS(i, k) is attached via the network 9 and outputting the stream at a time obtained by adding the fixed delay const(i) thereto using the time in the reception side system-A 600 as a reference. A fixed delay time applied by the reception side system-A 600 is a transmission delay time including a processing time of a buffer that absorbs fluctuation such as jitter of the transmission side system-A 500 and the reception side system-A 600 for each stream. Thus, even when sudden delay fluctuation such as jitter occurs in the network, it is possible to synchronize and output respective streams.

Moreover, because the present invention is a scheme of independently adjusting delays for respective streams, not a scheme of measuring delays of respective streams and removing delay differences therebetween, there is an exemplary advantage in that functions such as selection of a reference (a master) from among a plurality of streams and master/slave switching when an abnormal condition occurs are not required and stability is obtained.

It is to be noted that delay time control in the present exemplary embodiment can be generalized and expressed using a numerical expression as follows. In a system that transmits n video/audio streams ST1, ST2, . . . STn (where n is an integer greater than or equal to 1) via the network 9, the video/audio stream STi including the time code TS(i, k) generated by the transmission side system-A 500 (where i and k are natural numbers) is transmitted. In the reception side system-A 600, a predetermined fixed delay const(i) is set and an output time TD(i, k) in the reception side of each piece of data ST(i, k) to which the time code TS(i, k) of the video/audio stream STi is attached is determined as follows.

$$TD(i,k)=TS(i,k)+\mathrm{const}(i)$$

It is to be noted that if a plurality of video/audio streams STi are synchronized and output, the same fixed delay amount is given for all the streams STi by setting const(i)=Constant.

Simultaneously, the reception time Rt(i, k) of each piece of reception data ST(i, k) to which the time code TS(i, k) is attached is detected.

Here, because transmission delay fluctuation with a fast change such as network jitter results in fluctuation of the reception time Rt(i, k), the transmission delay fluctuation is eliminated by controlling a position where the reception data ST(i, k) is stored in the delay absorbing buffer (the delay absorbing buffer 133 or 139).

When the storage position in the delay absorbing buffer (i.e., the delay time of the delay absorbing buffer) is expressed as Buff_PT(i, k), the storage position Buff_PT(i, k) is calculated as the difference between the output time TD(i, k) and the reception time of each piece of reception data ST(i, k) as follows.

$$\text{Buff\_PT}(i, k) = \text{const}(i) - \{Rt(i, k) - TS(i, k)\}$$
$$= \text{const}(i) + TS(i, k) - Rt(i, k)$$
$$= TD(i, k) - Rt(i, k)$$

This means that the output time is determined in accordance with feedforward control that adjusts transmission delay fluctuation with a fast change such jitter by the storage position Buff_PT(i, k) in the delay absorbing buffer.

In this case, the output time TD(i, k) of each piece of reception data ST(i, k) is expressed as follows.

$$TD(i,k)=Rt(i,k)+\text{Buff\_PT}(i,k)$$

As described above, in the present exemplary embodiment, it is possible to stably perform synchronization reproduction of a plurality of streams with a given fixed delay in network transmission of the plurality of streams. It is to be noted that the present exemplary embodiment is a scheme of independently adjusting delays using an absolute time as a reference for respective streams, not a scheme of measuring delays of respective streams and removing delay differences therebetween. Thus, there is an exemplary advantage in that functions such as selection of a reference (a master) from among a plurality of streams and master/slave switching when an abnormal condition occurs are not required and stability is obtained.

In this way, the present exemplary embodiment has an exemplary advantage in that transmission delay fluctuation such as network jitter can be eliminated with high accuracy in video and/or audio stream distribution via the network, and a plurality of streams can be synchronized and output. In addition, in a system that transmits a video/audio stream via the network, reproduction control, stream synchronization switching, or the like of video/audio streams can be stably performed in fast response.

[Second Exemplary Embodiment]

Figure 3:
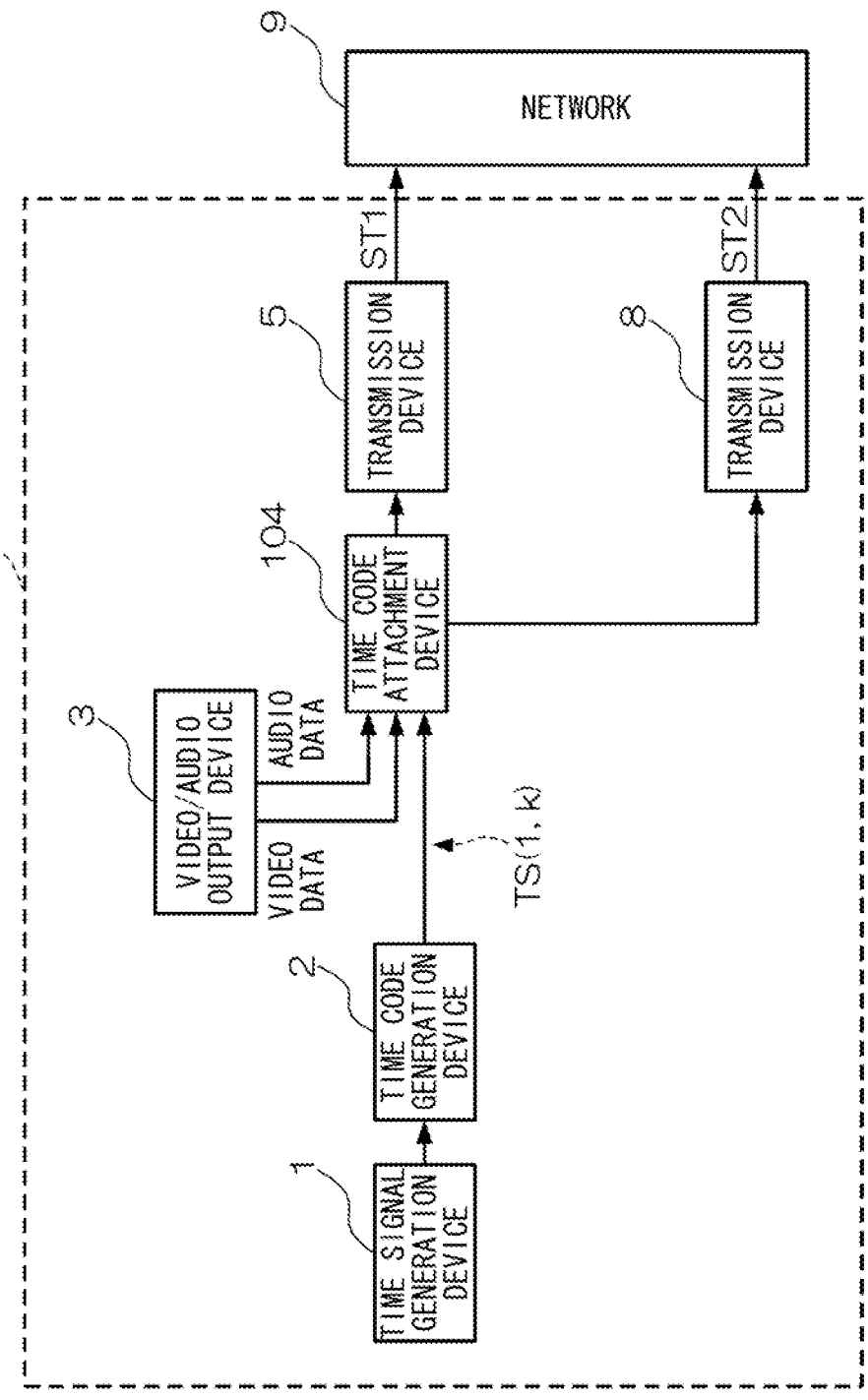
FIG. 3 is a block diagram showing a configuration of a transmission side of a second exemplary embodiment of the present invention.
Figure 4:
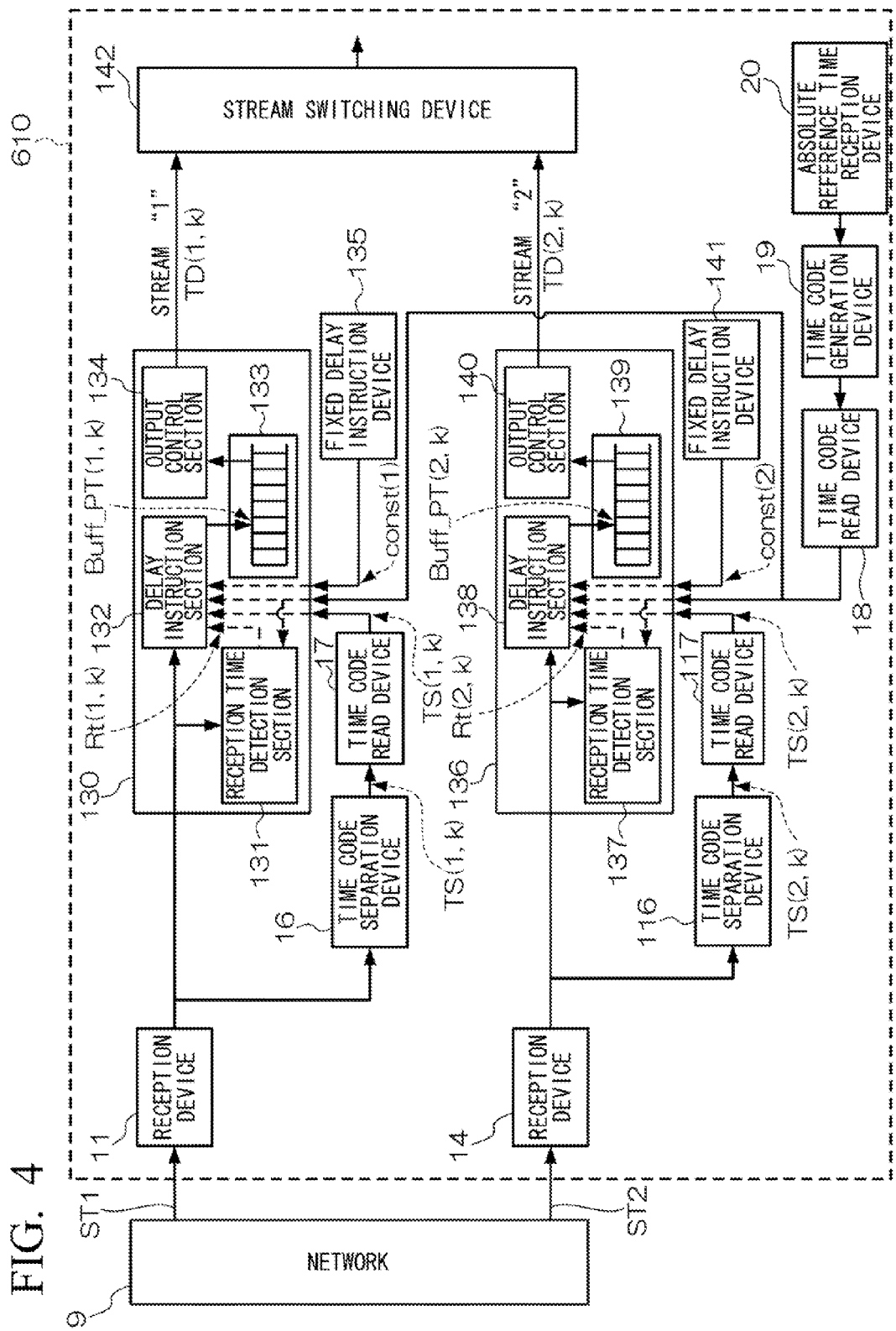
FIG. 4 is a block diagram showing a configuration of a reception side of the second exemplary embodiment of the present invention.

A stream signal transmission device of a second exemplary embodiment of the present invention is shown in FIGS. 3 and 4. The stream signal transmission device of the second exemplary embodiment of the present invention is configured by a transmission side system-B 510 shown in FIG. 3, a reception side system-B 610 shown in FIG. 4, and a network 9 shown in FIGS. 3 and 4. It is to be noted that in the present exemplary embodiment, the same configurations as those of the first exemplary embodiment described with reference to FIGS. 1 and 2 are denoted by the same reference symbols. In the present exemplary embodiment, one piece of video/audio is transmitted from the transmission side system-B 510 shown in FIG. 3 to the network 9 as two video/audio streams. The reception side system-B 610 shown in FIG. 4 selects and outputs one stream from among the received two video/audio streams. By adopting these configurations, the present exemplary embodiment constructs a redundant system that transmits one video/audio material to the network using a redundant line.

First, a block configuration diagram of the transmission side system-B 510 shown in FIG. 3 will be described. In the transmission side system-B 510 shown in FIG. 3, compared with the transmission side system-A 500 of FIG. 1, the video/audio output device 6 and the time code attachment device 7 are omitted, and a time code attachment device 104 is provided in place of the time code attachment device 4. In the transmission side system-B 510 of FIG. 3, the time signal generation device 1 receives an absolute reference time signal transmitted from a GPS satellite or the like, and outputs the time signal included in the received signal to the time code generation device 2. The time code generation device 2 generates a predetermined time code TS(1, k) in response to this time signal.

The time code TS(1, k) is input to the time code attachment device 104. Video data and audio data output from the video/audio output device 3 are also input to the time code attachment device 104. In the time code attachment device 104, the video data and the audio data are attached to the time code TS(1, k) and then input to the transmission device 5. Thereafter, the video data, the audio data, and the time code TS(1, k) are output from the transmission device 5 to the network 9 as a video/audio stream ST1.

Moreover, an output of the time code attachment device 104 is simultaneously input to the transmission device 5 and the transmission device 8. At this time, a signal input to the transmission device 8 is the same as that input to the transmission device 5 in which the same video data and the same audio data are attached to the time code TS(1, k). Then, the signal input to the transmission device 8 is output to the network 9 as a video/audio stream ST2 from the transmission device 8. That is, the video data and the audio data output from the video/audio output device 3 to which the time code is attached are distributed and output from the transmission device 5 and the transmission device 8 to the network 9. That is, the video/audio stream ST1 transmitted from the transmission device 5 and the video/audio stream ST2 transmitted from the transmission device 8 become the same signal.

Next, a block configuration diagram of the reception side system-B 610 shown in FIG. 4 will be described. Compared to the reception side system-A 600 of FIG. 2, in the reception side system-B 610 shown in FIG. 4, a stream switching device 142 is added at outputs of the delay control devices 130 and 136. In the reception side system-B 610 of FIG. 4, the reception devices 11 and 14 receive the video/audio streams ST1 and ST2 including the video data and the audio data transmitted on the network 9. A reception signal received by the reception device 11 is output via the delay control device 130. A reception signal received by the reception device 14 is output via the delay control device A stream "1" output from the delay control device 130 and a stream "2" output from the delay control device 136 are input to the stream switching device 142 and either one is selected and output.

The other configurations and operations of the reception side system-B 610 are the same as those of the reception side system-A 600 of FIG. 2.

In order to synchronize the stream "1" and the stream "2" of FIG. 4, a fixed delay const(1) of the fixed delay instruction device 135 and a fixed delay const(2) of the fixed delay instruction device 141 are set to the same value. As a result, the stream "1" and the stream "2" can be switched by the stream switching device 142 in a state in which the streams are synchronized with each other.

[System Configuration Examples of Above-Described Exemplary Embodiments]

FIGS. 5, 6, 7, and 8 are system configuration diagrams showing specific configuration examples of the transmission side systems and the reception side systems in accordance with the respective exemplary embodiments of the present invention. It is to be noted that in the following configuration, video/audio "11" or video/audio "21" input to a transmission side system-A 501 or 502 or a transmission side system-B 511 is a signal input to the video/audio output device 3 of FIG. 1 or FIG. 3, and video data and audio data output from the video/audio output device 3 are signals corresponding thereto. Video/audio "12" or video/audio "22" input to the transmission side system-A 501 or 502 is a signal input to the video/audio output device 6 of FIG. 1, and video data and audio data output from the video/audio output device 6 are signals corresponding thereto. The video/audio "11" or the video/audio "12" output from a reception side system-A 601 or 602 or a reception side system-B 611 is a signal corresponding to the stream "1" or the stream "2" output from the reception side system-A 600 or the reception side system-B 610 of FIG. 2 or 4.

Moreover, the stream "11" or "111" is a signal corresponding to the video/audio stream ST1 of FIGS. 1 to 4, and the stream "21" or "211" is a signal corresponding to the video/audio stream ST2 of FIGS. 1 to 4. Furthermore, fixed delays "1" and "2" are signals corresponding to fixed delays const(1) and const(2). Additionally, a fixed delay "3" is a signal corresponding to the fixed delay const(1). An "absolute reference time" corresponds to a time indicated by a reception signal of the absolute reference time reception device 20 of FIG. 2 or 4 (or the reception signal).

Figure 5:
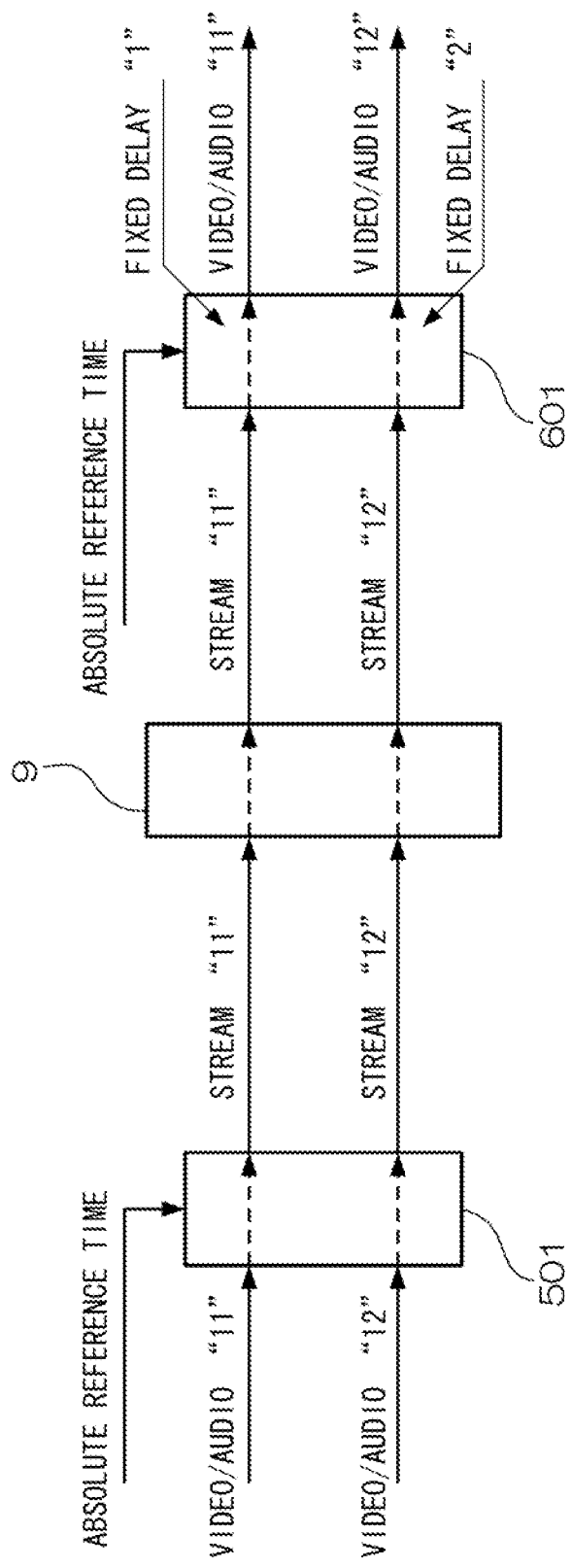
FIG. 5 is a block diagram showing a system configuration example using the first exemplary embodiment of the present invention.

In FIG. 5, the transmission side system-A 501 has the same configuration as the transmission side system-A 500 shown in FIG. 1, and the reception side system-A 601 has the same configuration as the reception side system-A 600 shown in FIG. 2. The absolute reference time is input to the transmission side system-A 501 and the reception side system-A 601, and time synchronization is performed. The video/audio "11" is input to the transmission side system-A 501, and is transmitted to the network 9 as the stream "11" to which a time code is attached. On the other hand, the video/audio "12" synchronized with the video/audio "11" is input to the transmission side system-A 501, and is transmitted to the network 9 as the stream "12" to which a time code is attached. The stream 11 is received by the reception side system-A 601, and the video/audio "11" is output after a transmission delay time in accordance with the setting of the fixed delay "1". The stream "12" is received by the reception side system-A 601, and the video/audio "12" is output after a transmission delay time in accordance with the setting of the set fixed delay "2". If the fixed delay "1" and the fixed delay "2" are set to the same value, transmission times of the stream "11" and the stream "12" from the transmission side to the reception side are adjusted to a fixed delay time. As a result, a plurality of streams synchronized by the transmission side can be synchronized and output by the reception side.

Figure 6:
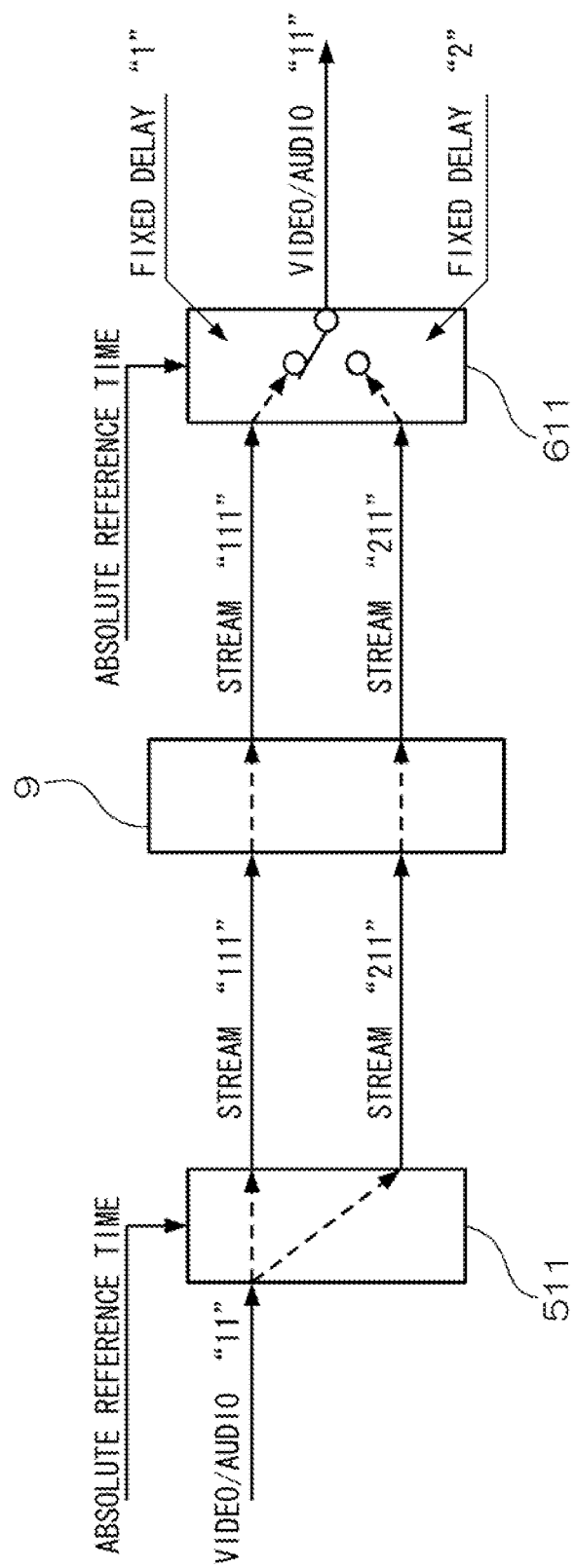
FIG. 6 is a block diagram showing a system configuration example using the second exemplary embodiment of the present invention.

In FIG. 6, the transmission side system-B 511 has the same configuration as the transmission side system-B 510 shown in FIG. 3, the reception side system-B 611 has the same configuration as the reception side system-B 610 shown in FIG. 4, and FIG. 6 shows a transmission system using a redundant line. The absolute reference time is input to the transmission side system-B 511 and the reception side system-B 611, and time synchronization is performed. The video/audio "11" is input to the transmission side system-B 511, and two streams "111" and "211" to which the same time code is attached are transmitted to the network 9. If the stream "111" is received by the reception side system-B 611 and an output based on the stream "111" is selected, the video/audio "11" is output after a transmission delay time in accordance with the setting of the fixed delay "1". On the other hand, if the stream "211" is received by the reception side system-B 611 and an output based on the stream "211" is selected, the video/audio "11" is output after a transmission delay time in accordance with the setting of the fixed delay "2". In the reception side system-B 611, one of a video/audio output of the stream "111" and a video/audio output of the stream "211" is selected, and the video/audio "11" is output from the reception side system-B 611. If the fixed delay "1" and the fixed delay "2" are set to the same value, transmission times of the stream "111" and the stream "211" from the transmission side to the reception side are adjusted to the fixed delay times. As a result, the two streams distributed by the transmission side are synchronized with each other in the reception side, and even when switching of the stream "111" and the stream "211" is performed, seamlessness (continuity) of an output of the video/audio "11" can be secured.

Figure 7:
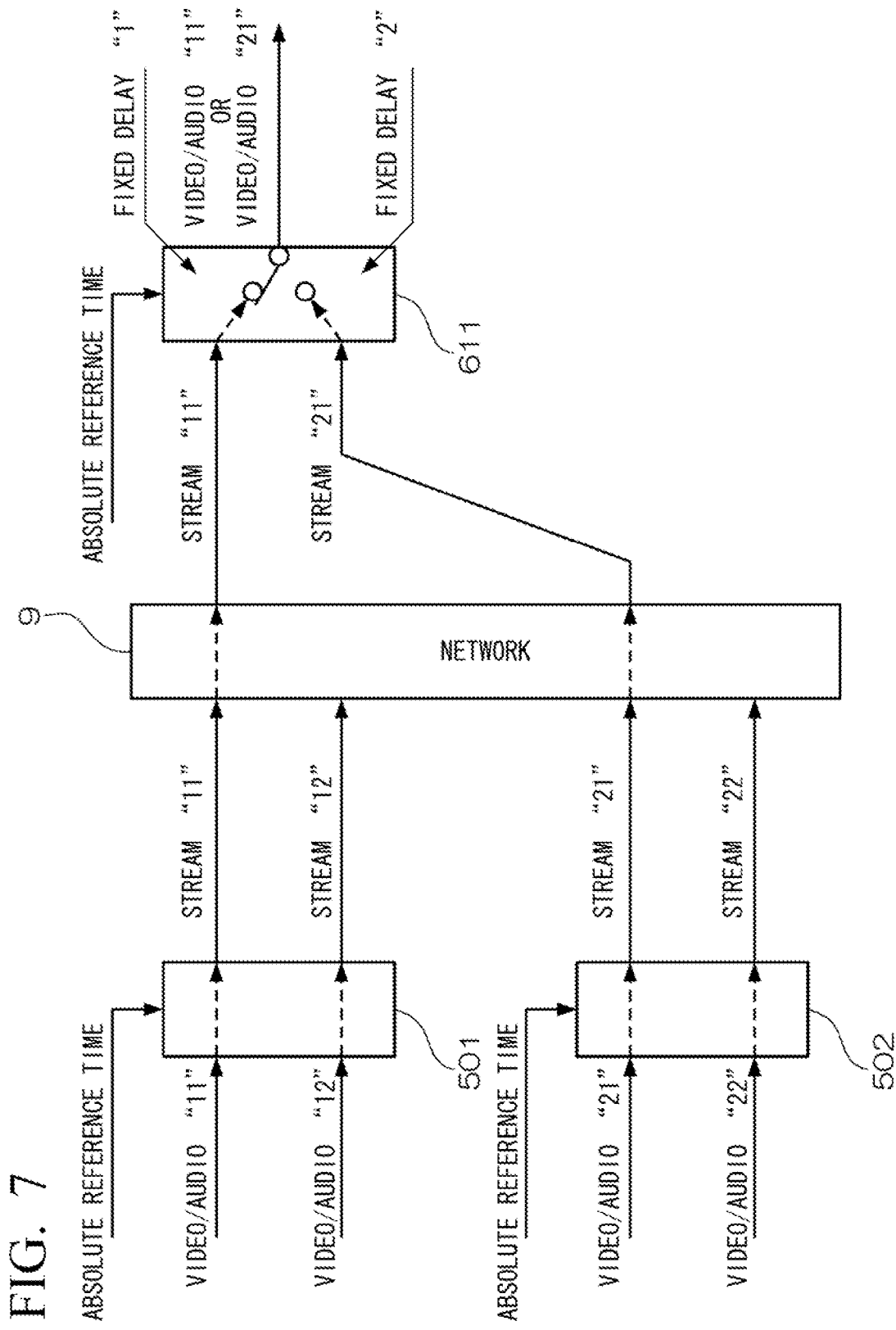
FIG. 7 is a block diagram showing a system configuration example using the first or second exemplary embodiment of the present invention.

In FIG. 7, the transmission side systems-A 501 and 502 have the same configuration as the transmission side system-A 500 shown in FIG. 1, and the transmission side systems-A 501 and 502 are installed in separated positions. The reception side system-B 611 has the same configuration as the reception side system-B 610 shown in FIG. 4. The absolute reference time is input to the transmission side systems-A 501 and 502 and the reception side system-B 611, and time synchronization is performed. The video/audio "11" is input to the transmission side system-A 501, and is transmitted to the network 9 as the stream "11" to which a time code is attached. Moreover, the video/audio "21" is input to the transmission side system-A 502, and is transmitted to the network 9 as the stream "21" to which a time code is attached.

If the stream "11" is received by the reception side system-B 611 and an output based on the stream "11" is selected, the video/audio "11" is output after a transmission delay time in accordance with the setting of the fixed delay "1". If the stream "21" is received by the reception side system-B 611 and an output based on the stream "21" is selected, the video/audio "21" is output after a transmission delay time in accordance with the setting of the fixed delay "2". One of the video/audio of the stream "11" and the video/audio of the stream "21" is selected, and the video/audio "11" or the video/audio "21" is output from the reception side system-B 611. If the fixed delay "1" and the fixed delay "2" are set to the same value, transmission times of the stream "11" and the stream "21" from the transmission side to the reception side are adjusted to a fixed delay time. As a result, when streams transmitted from separated positions are selected and output by the reception side, temporal continuity of the video/audio "11" and the video/audio "21" can be maintained.

In the configuration shown in FIG. 7, it is assumed that installation places of transmission side systems and a reception side system are different, for example, if the transmission side system-A 501 is in Osaka, the transmission side system-A 502 is in Nagoya, and the reception side system-B 611 is in Tokyo, streams are transmitted from Osaka and Nagoya to Tokyo, and one stream is selected therefrom in Tokyo. In network transmission of a plurality of streams between a plurality of sites in an N:1 configuration (where N is an integer greater Than or equal to 1), it is possible to perform synchronization reproduction of a plurality of streams with a given fixed delay.

Figure 8:
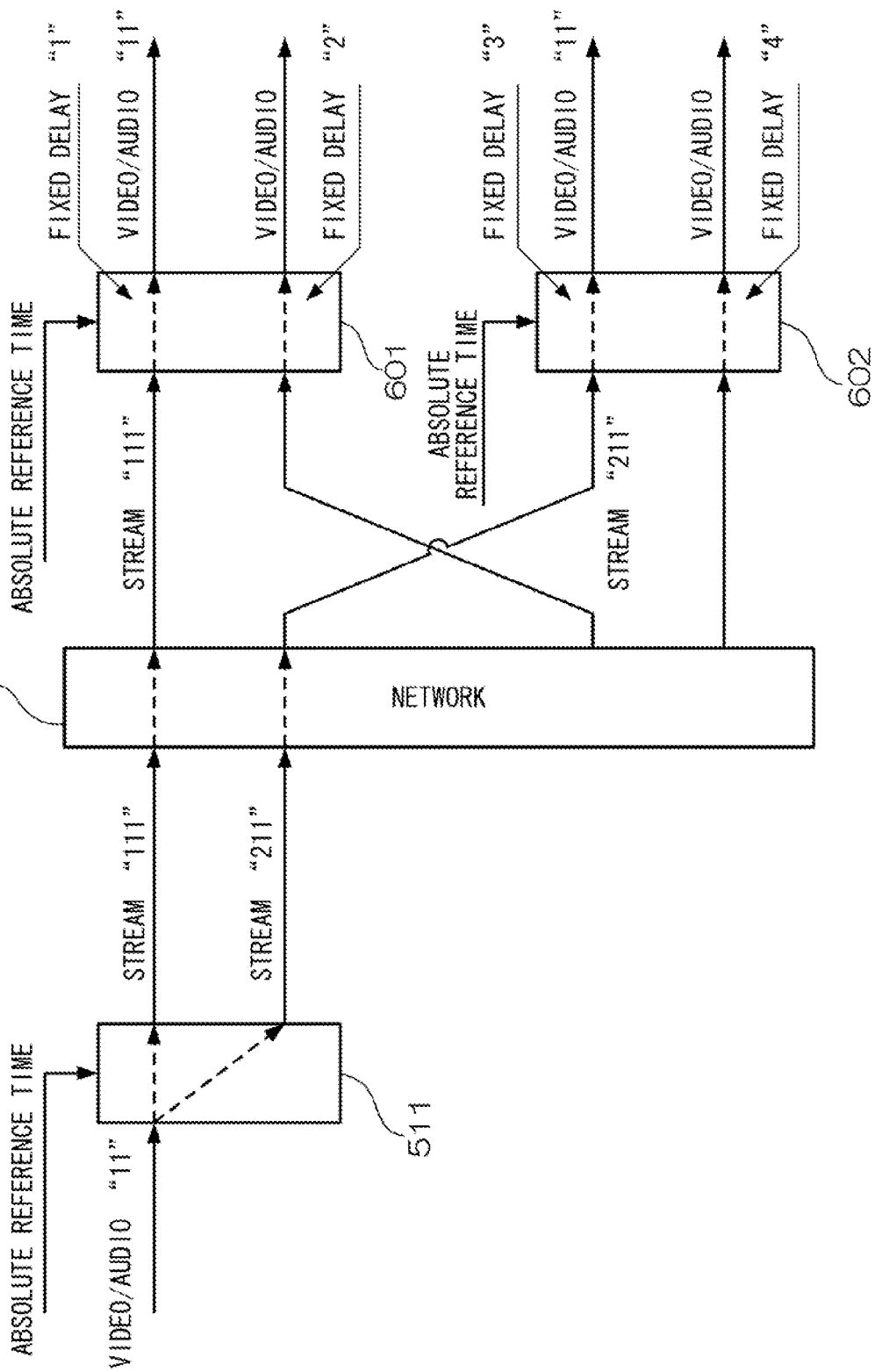
FIG. 8 is a block diagram showing a system configuration example using the first or second exemplary embodiment of the present invention.
Figure 9:
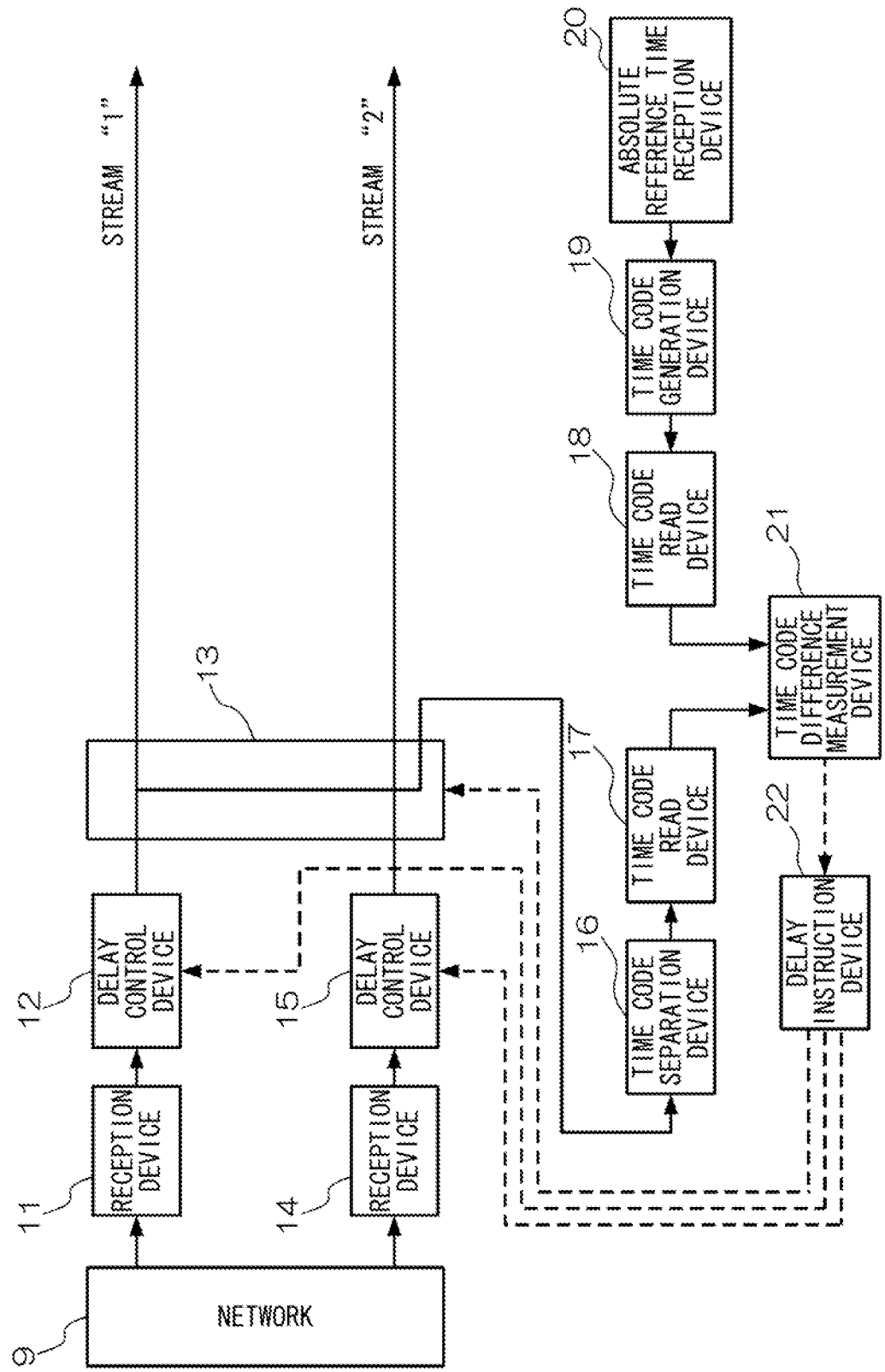
FIG. 9 is a block diagram showing a configuration example of a stream signal transmission device used to illustrate the background art of the present invention.

In FIG. 8, the transmission side system-B 511 has the same configuration as the transmission side system-B 510 shown in FIG. 3, and the reception side systems-A 601 and 602 have the same configuration as the reception side system-A 600 shown in FIG. 2. The absolute reference time is input to the transmission side system-B 511 and the reception side systems-A 601 and 602, and time synchronization is performed. The video audio "11" is input to the transmission side system-B 511, and two streams "111" and "211" to which time codes are attached are transmitted to the network 9.

The stream "111" is received by the reception side system-A 601, and the video/audio "11" is output after a transmission delay time in accordance with the setting of the fixed delay "1". The stream "211" is received by the reception side system-A 602, and the video/audio "11" is output after a transmission delay time in accordance with the setting of the fixed delay "3". If the fixed delay "1" and the fixed delay "3" are set to the same value, transmission times of the stream "111" and the stream "211" from the transmission side to the reception side are adjusted to a fixed delay time. As a result, one video/audio "11" can be distributed into two streams by the transmission side and the two streams can be received, synchronized, and output by a plurality of reception sides.

It is assumed that installation places of a transmission side system and reception side systems are different, for example, if the transmission side system-B 511 is in Tokyo, the reception side system-A 601 is in Osaka, and the reception side system-A 602 is in Nagoya, streams are transmitted from Tokyo to Osaka and Nagoya. In network transmission of a plurality of streams between a plurality of sites in a 1:N configuration (where N is an integer greater than or equal to 1), it is possible to perform synchronization reproduction of a plurality of streams with a given fixed delay.

In the present invention, a fixed delay from transmission of a plurality of streams until reception and output thereof is set, a time code is attached to each piece of data constituting a video/audio stream, and a delay time for the data is adjusted within the fixed delay based on the time code. Thus, it is possible to eliminate transmission delay fluctuation with a fast change such as network jitter with high accuracy and synchronize and output a plurality of streams. That is, in accordance with the present invention, it is possible to stably perform synchronization reproduction of a plurality of streams with a given fixed delay in network transmission of a plurality of streams.

Moreover, in network transmission of a plurality of streams between a plurality of sites, it is possible to stably perform synchronization reproduction of a plurality of streams with a given fixed delay.

Furthermore, the present invention is a scheme of independently adjusting delays for respective streams, not a scheme of measuring delays of respective streams and removing delay differences therebetween. Thus, there is an exemplary advantage in that functions such as selection of a reference (a master) from among a plurality of streams and master/slave switching when an abnormal condition occurs are not required and stability is obtained.

It is to be noted that exemplary embodiments of the present invention are not limited to the above. For example, one or more of the configuration of the first exemplary embodiment and the configuration of the second exemplary embodiment can be used and mutually combined, only one stream of video and audio can be transmitted as a video/audio stream, or a stream including both video and audio and a stream including only one of them can be mixed and transmitted. Moreover, in each drawing, it is possible to appropriately adopt a configuration of dividing respective blocks, integrate respective blocks, or divide or distribute the network 9 into a plurality of pieces. Furthermore, if an exemplary embodiment of the present invention is configured using software, it is possible to provide all or part thereof via a computer-readable recording medium or a communication line.

Additionally, the relationship between the respective configurations of the claims of the present application and the respective configurations of the above-described exemplary embodiments are as follows. The reception device 11 and the reception device 14 correspond to at least one reception unit that receives a stream signal to which a time code is attached from a network. Here, the stream signal corresponds to video/audio streams ST1, ST2, . . . , STn. At least one extraction unit that extracts the time code from the stream signal corresponds to the time code separation devices 16 and 116 and the time code read devices 17 and 117. The delay control devices 130 and 136 correspond to a delay control unit that determines an output time by adding a predetermined fixed delay to a time indicated by the time code, and outputs the received stream signal after holding the stream signal up to the output time. Moreover, the stream switching device 142 corresponds to a selection unit that selects a stream signal from among a plurality of stream signals output from a plurality of delay control units. Furthermore, the reception time detection sections 131 and 137 correspond to a reception time detection unit that detects a reception time when the reception unit has received a stream signal. Additionally, respective registers constituting a plurality of stages of registers, which are structural components of the delay absorbing buffers 133 and 139, correspond to a plurality of storage units.

While the present invention has been particularly shown and described with reference to exemplary embodiments thereof, the present invention is not limited to those exemplary embodiments. It will be understood by those of ordinary skill in the art that various changes in form and details may be made therein without departing from the spirit and scope of the present invention as defined in the claims.

This application is based upon and claims the benefit of priority from Japanese Patent Application No. 2009-026460, filed on Feb. 6, 2009, the disclosure of which is incorporated herein in its entirety by reference.

INDUSTRIAL APPLICABILITY

The present invention is suitable to be used when video and/or audio stream transmission is performed via a network. The present invention can eliminate transmission delay fluctuation with a fast change such as network jitter with high accuracy and synchronize a plurality of streams.

DESCRIPTION OF REFERENCE SYMBOLS

500, 501, 502: Transmission side system-A
600, 601, 602: Reception side system-A
510, 511: Transmission side system-B
610, 611: Reception side system-B
1: Time signal generation device
2: Time code generation device
3, 6: Video/audio output device
4, 7, 104: Time code attachment device
5, 8: Transmission device
9: Network
11, 14: Reception device
16, 116: Time code separation device
17, 117: Time code read device
18: Time code read device
19: Time code generation device
20: Absolute reference time reception device
130, 136: Delay control device
131, 137: Reception time detection section
132, 138: Delay instruction section
133, 139: Delay absorbing buffer
134, 140: Output control section
135, 141: Fixed delay instruction device
142: Stream switching device

The invention claimed is:
1. A stream signal transmission device comprising:
at least one reception unit that receives a stream signal to which a time code is attached from a network;
at least one extraction unit that extracts the time code from the stream signal received by the reception unit; and at least one delay control unit that determines an output time by adding a predetermined fixed delay to a time indicated by the time code extracted by the extraction unit, and outputs the stream signal received by the reception unit after holding the stream signal up to the output time, wherein the delay control unit comprises a reception time detection unit that detects a reception time when the reception unit has received the stream signal, and outputs the stream signal after holding the stream signal for a period of time obtained by subtracting the reception time from the output time.

2. The stream signal transmission device according to claim 1, wherein the at least one reception unit is a plurality of reception units, the at least one extraction unit is a plurality of extraction units, the at least one delay control unit is a plurality of delay control units, a plurality of stream signals to which time codes are attached are received from the network, and the plurality of delay control units synchronize and output the plurality of stream signals.

3. The stream signal transmission device according to claim 2, comprising:

a selection unit that selects the stream signal from among the plurality of stream signals output from the plurality of delay control units, wherein the stream signal selected by the selection unit is continuously output.

4. The stream signal transmission device according to claim 2, wherein the fixed delay is the same value for the plurality of stream signals.

5. The stream signal transmission device according to claim 1, wherein the delay control unit comprises a plurality of storage units having different holding times, and controls a storage position in the plurality of storage units in accordance with a holding time of the stream signal.

6. A stream signal transmission method comprising:

receiving, by a device including hardware, a stream signal to which a time code is attached from a network;

extracting, by the device, the time code from the received stream signal;

detecting, by the device, a reception time when the stream signal has been received;

determining, by the device, an output time by adding a predetermined fixed delay to a time indicated by the extracted time code; and outputting, by the device, the received stream signal after holding the received stream signal up to the output time for a period of time obtained by subtracting the reception time from the output time.

* * * * *